United States Patent [19]

Blakeslee, deceased et al.

[11] Patent Number: 5,147,436

[45] Date of Patent: Sep. 15, 1992

[54] METHOD FOR FORMING FLAT GLASS-CERAMIC ARTICLES

[75] Inventors: William W. Blakeslee, deceased, late of Corning, by Carol A. Blakeslee, executrix; Ronald A. Davidson, Horseheads; Edwin Q. Giles, Beaver Dams; Robert M. Menihan, Corning; David L. Naylor, Horseheads; Richard B. Pitbladdo, Corning; Martin J. Schad, Corning; Kevin B. Sterner, Corning; Jackson P. Trentelman, Painted Post; Jason S. Watts, Horseheads, all of N.Y.

[73] Assignee: Corning Incorporated, Corning, N.Y.

[21] Appl. No.: 682,657

[22] Filed: Apr. 9, 1991

[51] Int. Cl.$^5$ ............................................. C03B 11/00
[52] U.S. Cl. .................................... 65/33; 65/85; 65/83; 65/162; 65/348; 65/374.13; 65/374.15
[58] Field of Search ............... 65/33, 66, 83, 85, 348, 65/355, 356, 374.13, 374.15, 162, 323

[56] References Cited

U.S. PATENT DOCUMENTS

| | | | |
|---|---|---|---|
| 3,244,497 | 4/1966 | Copeland | 65/356 |
| 3,720,527 | 3/1973 | Duke | 65/33 |
| 3,992,180 | 11/1976 | Simmons | 65/33 |
| 4,036,624 | 7/1977 | Krohn | 65/33 |
| 4,083,727 | 4/1978 | Andrus | 65/33 |
| 4,969,944 | 11/1990 | Marechal | 65/85 |

OTHER PUBLICATIONS

Babcock, Forming in the Glass Industry, Ashlee Pub. Co. pp. 431-444.

Primary Examiner—W. Gary Jones
Assistant Examiner—John Hoffmann
Attorney, Agent, or Firm—Timothy M. Schaeberle; Clinton S. Janes, Jr.

[57] ABSTRACT

This invention contemplates a near net-shape method of making thin glass-ceramic articles possessing substantially uniform thickness and parallel opposing surfaces comprising the steps of: (a) heating the receiving and opposing molding surfaces of a mold to predetermined different temperatures; (b) bringing the receiving and opposing molding surfaces of the mold into close proximity to each other to press a delivered charge of molten glass to fill said mold, while thermally providing and maintaining a substantially parallel fit between the receiving and opposing surfaces of the mold, to achieve substantially uniform thickness in the pressed charge, (c) pressing the glass charge for a time sufficient to remove enough heat from the glass charge that the temperatures of the molding surfaces and the glass article surfaces are all nearly at equilibrium, wherein the press time and mold temperature differential combine to result in symmetric heat removal thereby causing all the aforementioned temperatures to reach equilibrium at nearly the same time, (d) removing the glass article from the mold; (e) covering the opposing surfaces of the glass article with a refractory insulating material; (f) heat treating the covered glass article at a temperature and for a time sufficient to cause the glass article to crystallize in situ to a glass-ceramic article; and (g) cooling the covered glass-ceramic article to room temperature and removing the covering therefrom.

4 Claims, No Drawings

METHOD FOR FORMING FLAT GLASS-CERAMIC ARTICLES

RELATED APPLICATIONS

U.S. Ser. No. 682556, filed concurrently herewith by J. Trentelman under the title Method of Press Molding Near Net-Shape Glass Articles is directed toward a method of press molding resulting in symmetric heat from a molten glass charge. U.S. Ser. No. 682553, allowed, filed concurrently herewith by Menihan et al. under the title Method and Apparatus for Parallel Alignment of Opposing Mold Surfaces is directed towards the press molding of glass articles exhibiting parallel opposing surfaces.

BACKGROUND OF THE INVENTION

This invention relates to a process for the production of thin, flat glass-ceramic articles. More specifically, this invention is directed toward a method of forming substantially flat, thin disc-shaped glass-ceramic articles of essentially uniform thickness using near-net-shape pressing followed by flat ceramming. The resultant discs after minimal finishing are suitable for use as substrates for magnetic memory discs.

The market for rigid magnetic storage is well established and growing with even greater advances being foreseen through the utilization of thin film media technology. The rigid disk substrates for use in these magnetic memory storage devices are designed for high performance applications and thus must meet a wide range of criteria. U.S. Pat. No. 4,971,932 (Alpha et al.) discloses a glass-ceramic substrate material for use in the rigid information disk which satisfies these varied criteria. These glass-ceramics, containing either a sheet silicate or a chain silicate as the predominate crystal phase, still, when made using traditional forming methods, fell short of some of these criteria without secondary processing. Chief among these shortcomings was the stringent flatness requirement the substrate must meet; for example, a disk having an outside diameter of 95 mm can only be as much as $\mu$m out of flat across its diameter. The traditional methods for making these glass-ceramic articles, typically manufactured from sheet glass or oversize blanks, not only fell considerably short of the flatness requirement (50–100 $\mu$m versus the required 10 $\mu$m), but they also exhibited a low raw material utilization efficiency. Because of this flatness shortcoming following initial forming, extensive and expensive mechanical finishing, i.e., grinding and polishing, was required to make the articles suitable for use as substrates. These two factors, low raw material utilization efficiency and extensive secondary finishing, led to a high cost of production for these traditional manufacturing methods. Therefore, it is self-evident that manufacturing costs could be minimized by reducing the secondary operations required, through increasing the flatness of the pressed article and increasing the raw material utilization through the implementation of a near net-shape production process.

Therefore, the object of this inventive method is to solve the prior art shortcomings and provide for a method of near net-shape manufacture, pressing and ceramming, which increases raw material utilization efficiency and which produces glass-ceramic magnetic memory discs substrates which possess the required flatness without extensive finishing.

SUMMARY OF THE INVENTION

In general, this invention contemplates a method of making glass-ceramic articles possessing substantially uniform thickness and parallel opposing surfaces comprising the steps of: (a) heating the receiving and opposing molding surfaces of a mold to predetermined different temperatures; (b) bringing the receiving and opposing molding surfaces of the mold into essential contact with each other to press a delivered charge of molten glass to fill said mold, while thermally providing and maintaining a substantially parallel fit between the receiving and opposing surfaces of the mold, to achieve substantially uniform thickness in the pressed charge, (c) pressing the the glass charge for a time sufficient to remove enough heat from the glass charge that the temperatures of the molding surfaces and the glass article surfaces are all nearly at equilibrium, wherein the press time and mold temperature differential combine to result in symmetric heat removal thereby causing all the aforementioned temperatures to reach equilibrium at nearly the same time, (d) removing the glass article from the mold; (e) covering the opposing surfaces of the glass article with a refractory insulating material; (f) heat treating the covered glass article at a temperature and for a time sufficient to cause the glass article to crystallize in situ to a glass-ceramic article; and (g) cooling the covered glass-ceramic article to room temperature and removing the covering therefrom.

In utilizing this method for producing the glass-ceramic certain outcomes are achieved (1) the forming of the glass article from the glass charge is nearly complete upon removal from the molding surface; and, (2) assuming that the tooling surfaces are substantially flat and parallel and that differential mold heating is utilized to avoid warping, the glass charge will assume the shape imparted to it by the press, i.e., a thin, substantially flat disc-shaped glass article (3) the glass article will retain it pressed shape, specifically its flatness, in its glass-ceramic form as a result of the heat treating step. Simply stated, the above steps describe a near net shape, both the pressing and heat-treating, forming method.

DESCRIPTION OF THE PREFERRED EMBODIMENT

The first step involved in the production of a typical glass-ceramic suitable for magnetic memory disk (hereinafter MMD) applications is differentially heating the receiving and opposing molding surfaces of a mold apparatus so that symmetric amounts of heat will be transferred from the subsequently delivered molten glass charge's surfaces. This step, directed towards the production of substantially flat glass articles, is more fully described in U.S. application Ser. No. 682556, filed simultaneously with this application in the name of Trentelman. The portion of that specification which describes this method of differentially heating the opposing molding surfaces is hereby incorporated by reference.

Next, a parallel fit is provided and maintained between the receiving and opposing molding surfaces, thus ensuring that the glass article subsequently pressed will possess substantially parallel opposing surfaces, i.e., a glass article of essentially uniform thickness. This method of thermally aligning the opposing molding surfaces to be parallel is more completely described in U.S. application Ser. No. 682553, allowed, filed simultaneously with this application in the name of Menihan et al. The portion of that specification describing the thermal method of parallel alignment is hereby incorporated by reference.

Once proper mold surface temperatures and parallel opposing molding surfaces are achieved, the molten glass may be delivered and pressed into the proper shape to form the glass article. A gob of molten glass of the precise weight to form the disc-shaped article and with a viscosity range from $10^2$–$10^3$ is cut and dropped onto the receiving molding surface of the molding apparatus. It is then indexed to a position where an opposing molding surface is brought into essential contact with this receiving molding surface, with the glass charge being pressed therebetween to form the desired disc-shape article. The glass article is then removed from the press.

However, note that the pressing of the glass charge continues until enough heat is removed from the charge such that the glass charge's temperature along with that of the opposing molding surfaces are all nearly at equilibrium at a point below the charge's softening point.

The glass composition embodying the preferred composition for the uniformly thick, substantially flat thin disc-shaped articles suitable as MMDs is that used as the precursor glass for the production of canasite glass-ceramics. This precursor glass composition, disclosed in U.S. Pat. No. 4,386,162 (Beall), consists essentially, in weight percent on the oxide basis of about 45–75% $SiO_2$, 8–30% CaO, 2.5–12% F, 3–15% $Na_2O$, 0–20% $K_2O$, 5–25% $Na_2O+K_2O$, 0–6% $B_2O_3$, 0–7% $Al_2O_3$, and 0–8% $ZrO_2$, with the most preferred composition stated to have an analyzed composition of about 50–65% $SiO_2$, 15–24% CaO, 3–13% $Na_2O$, 3–15% $K_2O$, 11–22% $Na_2O+K_2O$, 0–3% $B_2O_3$, 0–3% $Al_2O_3$, and 0–8% $ZrO_2$.

Once the glass article of the above composition has been pressed into the desired shape, the last step, ceramming, i.e., transforming the glass article into glass-ceramic form through heat-treating, is undertaken. However, prior to the actual heat-treating, the glass articles must be properly prepared. This preparation step involves covering the opposing flat surfaces of the disc-shaped glass article with setters. Covered discs ceram much flatter than uncovered discs due to the reduction of axial temperature gradients, which, in bodies as thin as required for MMD applications, would generally cause the disc to warp. Allowing the glass article to warp as a result of the heat-treating step would destroy the substantial flatness and essential uniform thickness achieved in the previous pressing steps.

The setter material used is preferably comprised of a refractory-type insulating material; representative materials include cordierite, alumina and graphite. However, the most preferred material is graphite due to the fact that graphite produces much flatter parts than the other materials; some as flat as 1 $\mu$m across the diameter. Additionally, graphite setters tend to produce parts with much greater surface smoothness.

It is not necessary to stack these "sandwiches" for the invention to be operative; however, stacking of the disks will reduce both the cost and size of the ceramming equipment. There is no ideal number of disks to be utilized resulting in flatness measurements of 7.3+/−2.0 $\mu$m across a 95 mm disk diameter.

One added requirement to the ceramming step, if stacking of the disks is undertaken, is the addition of a layer of insulation located on both the top surface or the uppermost setter and bottom surface of the lowermost setter. This insulation layer, comprised of any low thermal conductivity material, essentially eliminates the axial temperature gradients experienced by the top and bottom disks in their uninsulated state. Specifically for this embodiment FIBERFRAX insulation marketed by Carborundum, Niagara Falls, N.Y. was used. Insulation thickness, ranging from 1/16 in. to ¾ in. was effectively used.

Generally, for ceramming the above described precursor glass into its canasite glass-ceramic state, the glass is suitably heated at a temperature somewhat above its annealing point for a time at least sufficient to develop crystal nuclei therein. The glass is then further heated, usually at a higher temperature between the glass annealing and glass softening points, to develop the predominate crystal phase therein. The ceramming schedule for the preferred embodiment involves a five stage heat treatment: (1) heating from ambient temperature to about 600° C. at the rate of approximately 150° C./hour; (2) maintaining the temperature of about 600° C. for 2 hours to cause the development of nuclei; (3) heating to about 850° C. at the rate of approximately 125° C./hour; (4) maintaining the temperature at about 850° C. to develop the canasite crystals on the developed nuclei; and, (5) allowing the glass-ceramic article to cool to ambient temperature.

It is claimed:

1. A method for press molding a thin, substantially flat glass-ceramic article possessing a substantially uniform thickness comprising the steps of:
    (a) preheating a receiving molding surface and an opposing molding surface of a mold to predetermined different temperatures;
    (b) then delivering to said receiving molding surface a glass charge;
    (c) aligning and maintaining said receiving and molding surfaces such that they are in a substantially parallel relationship;
    (d) bringing said receiving and opposing molding surfaces of said mold into close proximity to press mold said delivered charge of molten glass into a press molded glass article of substantially uniform thickness for a period of time sufficient to symmetrically remove enough heat from the press molded glass article to result in said receiving and opposing molding surfaces and the press molded glass article surfaces reaching nearly equal temperatures in nearly the same amount of time;
    (e) removing said press molded glass article from said mold;
    (f) placing said press molded glass article between, and into contact with, opposing layers of a refractory insulating setter material;
    (g) heat treating said glass article placed between the layers of setter material at a temperature and for a time sufficient to cause said glass article to thereby form a glass-ceramic article; and
    (h) cooling said glass-ceramic article to room temperature and removing the glass-ceramic article from the layers of setter material.

2. A method according to claim 1 wherein said refractory insulating setter material is selected from the group consisting of alumina, cordierite, and graphite.

3. A method according to claim 1 wherein said receiving and opposing molding surfaces are comprised of a material which exhibits near zero thermal expansion and possesses a substantially non-stick surface, said material selected from the group consisting of boron nitride, boron nitride composites, silicon carbide, silicon carbide coated graphite and pyrolytic graphite.

4. A method according to claim 1 wherein a plurality of press molded glass articles are placed in a stack having a layer of refractory insulating setter material disposed between, and in contact with, said adjacent press molded glass articles, said stack has at least one pair of outermost press molded glass articles, and said stack being placed between, and into contact with, opposing layers of a refractory insulating setter material of sufficient thickness to eliminate increased axial temperature gradients experienced by said outermost press molded glass articles.

* * * * *

UNITED STATES PATENT AND TRADEMARK OFFICE
CERTIFICATE OF CORRECTION

PATENT NO. : 5,147,436

DATED : September 15, 1992

INVENTOR(S) : Blakeslee, deceased, et al.

It is certified that error appears in the above-identified patent and that said Letters Patent is hereby corrected as shown below:

Column 1, line 43, change " μm" to --10 μm--.

Column 3, lines 62 and 63, change "to be utilized" to --to be stacked; stacks as high as 43 parts have been effectively utilized--.

Signed and Sealed this

Twenty-first Day of September, 1993

Attest:

BRUCE LEHMAN

Attesting Officer

Commissioner of Patents and Trademarks